Sept. 5, 1933. W. W. ODELL 1,925,151
PROCESS OF TREATING COMBUSTIBLE GAS
Filed Feb. 27, 1931
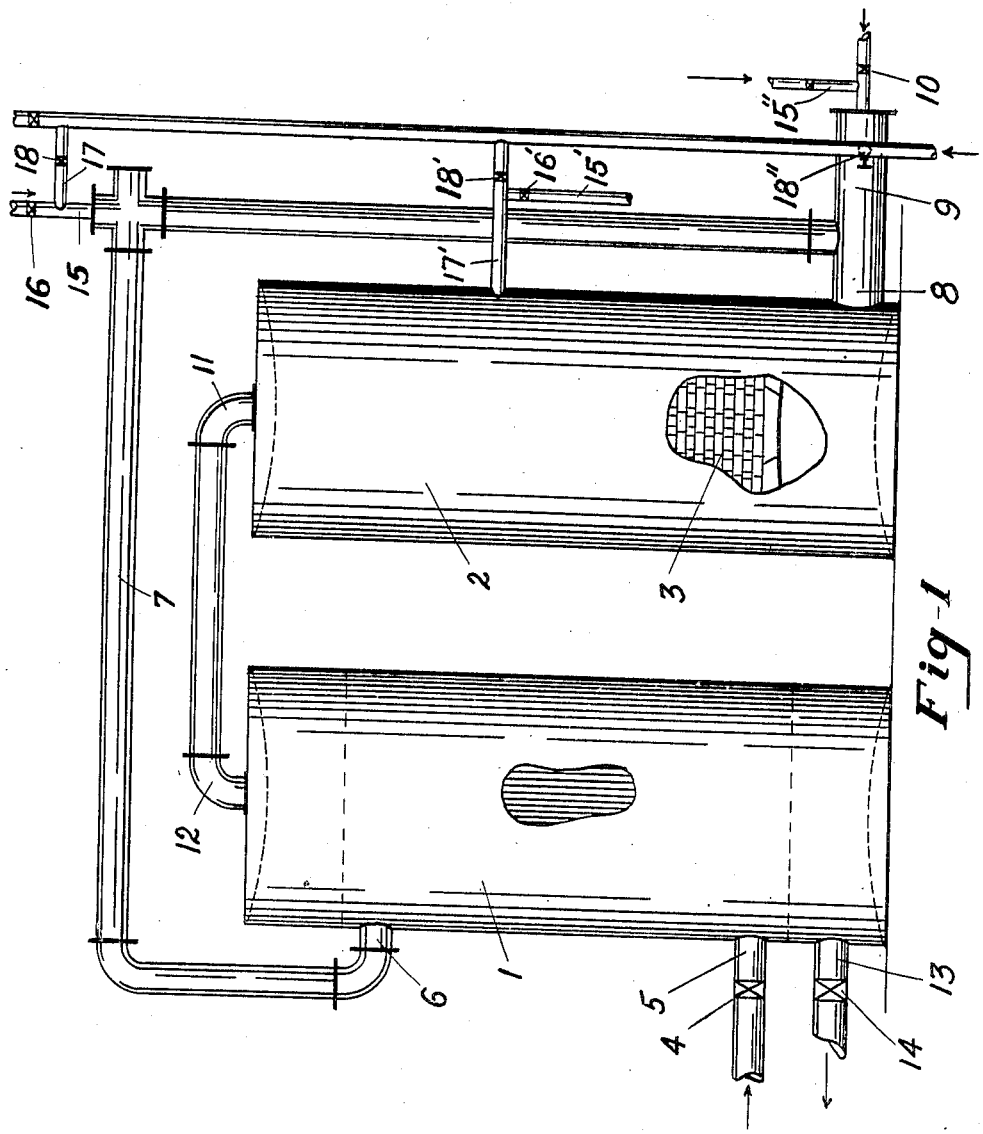

Patented Sept. 5, 1933

1,925,151

UNITED STATES PATENT OFFICE 1,925,151

PROCESS OF TREATING COMBUSTIBLE GAS

William W. Odell, Chicago, Ill.

Application February 27, 1931
Serial No. 518,651

16 Claims. (Cl. 23—3)

My invention relates to a process of treating gas and removing therefrom gum-forming and resin-forming compounds. The gas initially may be a refinery gas such as is produced in the refining of petroleum, or other gas containing unsaturated hydrocarbon compounds. The gum-forming compounds may be styrene, indene, cyclopentadiene, butadiene or similar unsaturate that may be readily polymerized.

One of the objects of my invention is to make petroleum refinery gases more suitable for use alone or in mixtures with other gases as city gas, namely, adapted for transmitting through gas distributing systems.

In the production of motor fuel from petroleum one kind of refinery gas produced contains about 1.0 per cent of butadiene. Only a portion of this is removed in the oil-washing process to which the gas is commonly subjected at the refinery; and I find that it is necessary to remove substantially all of it in order to transmit the gas at superatmospheric pressure through a gas-distribution system without the annoyance of deposits of gummy matter resulting from polymerization of the butadiene or from oxidation of butadiene.

One method proposed for removing certain unsaturates comprises oxidizing them by admixing air or oxygen with the gas; this is often objectionable because of the time required for the reaction to occur unless a catalyst is used. Acid washing I find is too expensive and sometimes results in the removal of desirable gas components. In my process I heat the gas by internal substantially complete combustion of a portion of the gas and cause the heated gas to contact the surface of heated contact material which should be refractory in nature and preferably catalytic to the polymerization or oxidation of the gum-forming compounds present in said gas.

In the operation of a petroleum refinery it is common that the demand for the refinery gas is not uniform throughout a day of 24 hours nor is the daily demand uniform throughout the various seasons of the year. This is particularly true when the gas is sold to public utilities such as gas-distributing companies. The tendency seems to be for refineries to produce more gas, progressively with their development and to so modify the quality that it is useable mixed in large proportions with other combustible gases or gas mixtures. I have found that the straight refinery gas as commonly made has a calorific value ranging from about 1200 to 1700 B.t.u. per cubic foot. This gas, besides containing butadiene or other undesirable unstable, unsaturated hydrocarbon has a specific gravity approximating 1.0 whereas that of coal gas is 0.45 blue (water) gas is 0.55 and carbureted water gas is 0.60 to 0.68; it is frequently desirable to mix one or more of the latter gases with refinery gas. It is apparent from the foregoing that it is sometimes desirable to change the properties and density of the gas as well as remove the gum-forming materials therefrom. This is, in combination one of the objects of my invention. A refinery gas having a specific gravity 1.0 can not be used interchangeably with coke oven gas or carbureted water gas in a given appliance without making burner adjustments.

Although I prefer not to limit myself to any specific apparatus for carrying out my process, for the purpose of clearness one form of apparatus is shown in vertical elevation in Figure 1. A portion of each of the shells in the figure is cut away to show the interior in section.

In the figure, 1 is a heat exchanger having inlet 5 for gas with control valve 4, outlet 6 for preheated gas, connected by conduit 7 and inlet 8 to the reaction chamber 2. The outlet for reaction products from 2 is through 11 which is connected by conduit to the intake 12 to the heat exchanger 1 which has an outlet 13 and control valve 14. Solid contact material (catalyst) is shown at 3 in chamber 2.

Premixed gas and air or combustion products therefrom, are introduced into the reaction chamber through 9 and 8. A separate inlet for air alone or other oxidizing agent is shown at 15, with control valve 16. The steam inlet 17 has control valve 18.

Referring to the figure, I normally proceed as follows: Gas, in this example refinery gas, containing butadiene, is introduced into heat exchanger 1 through 4 and 5 under superatmospheric pressure, preferably at a pressure much greater than one atmosphere and preferably at about 50 to 175 pounds per square inch absolute pressure; the gas thus introduced is caused to pass under its own pressure through the heat exchanger in heat-exchange relation with products from 2 whereby the temperature of the gas is raised to about 300° F. to 800° F. The preheated gas is then conducted through 6, 7 and 8 into chamber 2. Simultaneous with the passage of the preheated gas into reaction chamber 2 another (smaller) portion of the gas is completely burned adjacent thereto or therein and the hot products of combustion are caused to mix with the preheated gas, bringing the temperature of the mixture up to a predetermined level, usually within the range 600° F. to 1450° F. according to the effects desired and to the duration of the contact of hot gases with the contact material 3 in the chamber, as subsequently described. The mixed hot gas is caused to pass through the bed of heated contact material 3 under said superatmospheric pressure and then through 11 and 12 into and through heat exchanger 1 and out through 13 and 14. Much of the sensible heat of the hot gas from the reaction chamber is recovered and utilized in preheating the gas admitted to heat exchanger through 5.

In the upward passage of the hot gas through the bed of heated contact material 3 the butadiene is polymerized and the polymerized product when cooled is not gaseous and can readily be removed from the gas by mechanical means. A heated refractory is catalytic to polymerization although with ordinary fire brick a quite definite appreciable time is required for complete reaction which is of the order of 1 to 5 seconds at 60 pounds pressure at respective temperatures of 1400° F. to 600° F. Active catalysts which are of particular value at temperatures below about 1400° F. are aluminum phosphate, iron oxide, aluminum oxide, thoria, combinations of them and other metal oxides and salts known to have similar catalytic properties. The gas burned in 9 for the purpose of further heating the preheated gas from the heat exchanger and for maintaining the bed 3 at suitable operating temperatures is preferably the crude gas containing sulphur compounds. The reason is that upon its complete combustion (and its combustion is at least substantially complete) the sulhur compounds burn to sulphur dioxide which is catalytic to polymerization; it will be noted that when some sulphur dioxide is present in the reacting gas in the reaction chamber a lower temperature may be employed in conducting the reactions (temperature of the hot gas and of the contact mass) than when it is not present, in order to obtain a given result with respect to polymerization of the gum-formers. The amount of sulphur dioxide present is not great and it functions as a catalyst not merely by direct oxidation. The amount of sulphur dioxide commonly present may be computed from the following: The amount of gas burned in the process is approximately 1.0 per cent of the total gas processed, being more or less according to the initial temperature of the gas, the final temperature desired and amount of heat recovered in the heat exchanger in preheating the gas for processing. The amount of sulphur in the fuel gas is commonly 30 to 250 grains per 100 cubic feet. Accordingly the amount of sulphur that is present (usualy as sulphur dioxide or other oxidized form) in the total gas mixture in this example is approximately one per cent (1.0%) of the 30 to 250 grains or .03 to 2.5 grains per 100 cubic feet. The actual amount of sulphur may be somewhat less, or more than these amounts. The amount of butadiene commonly present in refinery gas is of the order of 100 to 200 grains per 100 cubic feet; in the crude refinery gas before cooling and oil scrubbing for the removal of gasoline vapors butadiene is sometimes present in amounts aproximating 1.0 per cent by gas volume or about 1000 grains per 100 cubic feet.

I find that the presence of a small amount of steam (water vapor) in the gas being processed in the reaction chamber is beneficial in the elimination of gum-forming constituents; this holds true even at moderately low temperatures such as 700° to 1000° F. and therefore I do not consider that this effect is due to the water gas reaction. It is probable that besides polymerization, hydration also occurs, that is, some of the gum formers tend to combine directly with water vapor under pressure to form hydration products. The use of steam is also beneficial in keeping the catalyst bed clean and free from deposited matter.

I prefer not to limit myself to a particular catalyst or to any catalyst other than ordinary refractory material. However, I prefer to use a catalyst, one not readily affected by sulphur compounds. Aluminum oxide, iron oxide or aluminum phosphate with or without other metal oxide catalysts are satisfactory and I prefer to use them as a surface coating on other refractory material such as fire brick.

The rate of passage of the reactant through the reaction chamber is regulated to give the necessary duration of contact with the refractory. Under some conditions it is desirable to prevent cracking of the hydrocarbons having a relatively high molecular weight such as butane, pentane or other similar hydrocarbons; in such cases it is desirable to use steam with the gas being processed and to operate at a moderately low temperature; with the contact mass 3 at a temperature of 650° F. to about 1000° F. the duration of contact of said gas with said mass being about 6 to 3 seconds when the mass is comprised of fire brick. When the mass consists of fire brick coated with an active catalyst the rate of flow of the gas may be greater than that indicated by the 6 to 3 seconds duration of contact with catalyst mass. Under a different set of conditions it may be desirable to allow some of the hydrocarbons of relatively high molecular weight to crack by pyrolysis; in this case a higher temperature, approximating 1200° to 1450° F. may be employed and the duration of contact of reactant gas with the refractory mass may be greater than that required merely to cause polymerization.

The composition of one type of refinery gas is as follows:

| | Percent by volume |
|---|---|
| Hydrogen | 7.0 |
| Methane | 25.0 |
| Ethane | 10.0 |
| Higher paraffins | 5.0 |
| Ethylene | 27.0 |
| Prophylene | 16.0 |
| Butylene | 9.0 |
| Butadiene | 1.0 |
| | 100.0 |

The sulphur compounds in the above gas were not separately determined.

In preheating the gas to be treated it is desirable to recover the maximum amount of the sensible heat of the processed gas by heat exchange. The greater the efficiency of heat transfer in the heat exchanger the less is the amount of fuel gas required in the process. It is desirable to have a minimum amount of dilution of the gas by the products of combustion and therefore it is desirable to use the minimum amount of fuel gas. This I accomplish by directly connecting the reaction chamber with a heat exchanger; the effect is new so far as I am aware and I claim as my own this combination along with means for internally (directly) applying heat by the complete combustion of a small portion of gas in direct contact with the gas to be processed. When operating with high temperatures in the reaction chamber (temperatures approaching 1450° F.) a temperature of about 700° to 850° F. can be attained in the preheated gas at outlet of the heat exchanger.

Superatmospheric pressure favors both the polymerization reactions and hydration reactions, and I therefore prefer to employ superatmospheric pressure in my process. Such pressures also retard cracking reactions. Very high pressures may be used but I prefer to employ working pressures of less than 200 pounds gage per square inch.

When an excess of air is used, that is, an excess over that amount required for the complete combustion of the fuel gas admitted to 2 through 10, it may be introduced with the gas through 10 or it may be separately introduced through 15 and 16 or 15'' and 16''. The excess of oxygen or air is used for the purpose of maintaining uniformity of temperature in the contact mass. I prefer to use this excess air in small amounts only and I prefer to introduce it or a part thereof after the gas to be treated has been heated to more than 650° F. One means for introducing air is shown at 15', 16' and 17'. No oxygen or air is used as excess through 17', 16' and 15' when the temperature in the contact mass is above 1200° F. The amount of air or oxygen used is such that the finished, processed gas contains less than 0.5 per cent oxygen.

The quantity of steam used is small, being usually about 10.0 per cent volume of the gas processed. More or less steam may be used but it is apparent that as the amount of steam used is increased the amount of fuel gas required increases.

Summarily, my process may be described as follows: Gas under pressure of about 50 to 175 pounds absolute per square inch, containing gum-forming unsaturates that are readily polymerizable is preheated to a temperature of 400° to 800° Fahrenheit, the preheated gas is then caused to contact flame and combustion gas and become heated to a higher temperature and caused to contact a solid refractory material confined in a reaction chamber in the presence of a small amount of water vapor and preferably a small amount of oxygen for a sufficient time to cause chemical change in the nature of the said unsaturates; preferably the reacting gas in the reaction chamber contains a small amount of a gaseous catalyst such as sulphur dioxide; the sensible heat of the reaction products is largely utilized in the gas preheating stage of the process. The pressures of 50 to 175 pounds are not limiting pressures but are given as an example of typical conditions. The chemical change referred to above and in the claims is largely polymerization but may include hydration and oxidation.

It is understood that the fuel gas or hydrocarbon fuel admitted with air through 10 may be completely burned in 9 or the combustion may be completed only after it has passed into or through 8 in contact with the gas to be treated; it is essential for the effective and efficient utilization of the fuel that upon combustion the products therefrom be immediately contacted with and mixed with the gas to be treated. A hydrocarbon fuel is referred to because it yields water vapor upon combustion, thus there is always some water vapor present in the reacting gas mixture. Additional water vapor may be added as disclosed above. There is always some sulphur dioxide present in the reacting gas when the fuel used contains sulphur and when sufficient oxygen is used in its combustion to produce and maintain it.

Somewhat similar results may be obtained by incorporating a predetermined amount of air with the preheated gas to be treated without separately completely burning a portion of the gas as fuel; when this is done with a gas containing sulphur compounds said compounds are converted to sulphur dioxide or to sulphur and sulphur dioxide, substantially to the equivalent of the oxygen content of the gas prior to reaction. The reactions that may occur are typified by the following equations:

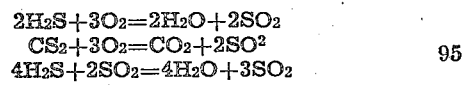

Both sulphur and sulphur dioxide are strongly catalytic to polymerization of the unstable olefinic hydrocarbons. It is evident that if the gas to be treated initially contains organic sulphur compounds they may be converted to free sulphur and sulphur dioxide at the usual operating temperatures, thus necessitating their subsequent removal by an alkaline wash or the equivalent. Ordinarily the specifications for city-gas permit the presence of organic sulphur compounds in said gas in amounts approximating 30 to 40 grains per 100 cubic feet. One advantage in completely burning a portion of the gas (the fuel gas portion) in heating the remainder to the desired temperature is that less acid ($SO_2$) is produced and less neutralizing agent is subsequently required. Another advantage is that when operating at nominal temperatures of 750° to about 1000° F. less of the aldehydes and foul smelling compounds are formed than when air is admitted alone into the heated gas to be treated. In other words only a small amount of oxygen or sulphur dioxide or both is required for catalytic purposes and I prefer not to produce more than is desirable in my process. The metal heat exchanger as shown at 1 in the figure has a shorter life as the amount of sulphur dioxide in the cooling gas (treated gas from 2) increases.

Having described my process so that one skilled in the art can practice it, I claim:

1. The process of treating combustible gas containing unstable olefinic hydrocarbons, comprising, preheating said gas to a temperature approximating 300° F. causing the preheated gas to co-mingle with freshly generated hot gaseous products from the substantially complete combustion of a hydrocarbon, thus becoming heated to a higher temperature, and causing the heated mixture to contact a bed of solid refractory material whereby said olefinic hydrocarbons are converted by chemical change into vapors of more stable products.

2. The process of treating combustible gas containing unstable olefinic hydrocarbons, comprising, preheating said gas under superatmospheric pressure to a temperature of 300° to 800° F. causing the preheated gas to co-mingle with hot freshly generated gaseous products from the substantially complete combustion of a hydrocarbon, thus becoming heated to a higher temperature, and causing chemical reaction to occur in the heated mixture while under said pressure, whereby said olefinic hydrocarbons are converted by chemical change into vapors of more stable products.

3. The process of treating combustible gas containing unstable olefinic hydrocarbons, comprising, preheating said gas under superatmospheric pressure to a temperature of 300° to 800° F. causing the preheated gas to co-mingle with freshly generated hot gaseous products from the substantially complete combustion of a hydrocarbon, thus being heated to a higher temperature, and causing the heated mixture still under pressure to contact a bed of solid refractory material for a sufficient time to convert substantially all of said olefinic hydrocarbons by chemical change into vapors of more stable products, said refractory material being catalytic to the polymerization of said olefinic hydrocarbons.

4. The process of treating combustible gas containing unstable olefinic hydrocarbons, comprising, causing said gas under superatmospheric pressure of the order of 50 pounds absolute at a temperature of about 300° to 800° F. to mix with freshly generated hot gaseous products from the substantially complete combustion of a hydrocarbon thereby causing the mixture to attain a higher temperature than said 300° to 800° F., causing the heated mixture in the presence of water vapor and while under said pressure to contact a solid, refractory catalyst adapted to catalize polymerization of olefins, thereby converting said unstable hydrocarbons through chemical change into vapors of more stable compounds one of which is a polymerization product, and subsequently removing said product from the resultant gas by known steps.

5. The process of treating combustible gas containing unstable olefinic hydrocarbons, comprising, causing said gas under absolute pressure of about 50 to 175 pounds per square inch to mix with freshly generated hot products from the combustion of a hydrocarbon and to be heated to a temperature of 650° to 1450 F. causing the hot mixture in the presence of water vapor and a gaseous oxidizing agent to contact a solid catalyst adapted to catalize polymerization, thereby converting said unstable hydrocarbons through chemical change into more stable compounds, and subsequently removing the readily condensable reaction-products from the resultant gas by known steps.

6. The process of treating combustible gas containing unstable olefinic hydrocarbons, comprising, causing said gas under absolute pressure of about 50 to 175 pounds per square inch to mix with freshly generated hot products from the combustion of a hydrocarbon, comprising carbon dioxide and water vapor and to be heated to a temperature of 650° to 1450° F. causing the hot mixture in the presence of a relatively small amount of a gaseous oxidized sulphur compound to contact a mass of solid refractory material, thereby converting said unstable hydrocarbons through chemical change into the vapors of more stable compounds, subsequently cooling the resultant gas and removing therefrom readily condensable products of reaction.

7. The process of treating combustible gas containing unstable olefinic hydrocarbons, comprising, heating said gas under pressure appreciably greater than one atmosphere to a temperature of 300° to 800° F., mixing the heated gas with hotter gas comprising the freshly generated products from the substantially complete combustion of a hydrocarbon and a sulphur compound, causing the mixed gas while under said pressure to contact a hot solid catalyst for a period of 1 to 6 seconds thereby forming vapors of more stable compounds from said unstable hydrocarbons and subsequently cooling the resultant gas and removing therefrom the readily condensable products of reaction; said catalyst having the property of catalyzing polymerization.

8. The process of treating combustible gas containing an unstable olefinic hydrocarbon, comprising, causing said gas under absolute pressure of 50 to 175 pounds and preheated to about 650° F. to co-mingle with hot gas comprising the freshly generated products from the combustion of a mixed gas containing a hydrocarbon and a sulphur compound substantially in contact with said preheated gas thus raising the temperature of said preheated gas, causing the mixed gas to contact a heated solid catalyst adapted to catalyze polymerization reactions thereby forming the vapor of a polymer of said unstable hydrocarbon, and subsequently cooling the resultant gas and removing said polymer therefrom.

9. The process of treating combustible gas, being a petroleum refinery gas, comprising heating said gas under super atmospheric pressure to a temperature of 300° to 800° F., completely burning another portion of said gas adjacent thereto, causing the freshly generated hot products of combustion under said pressure to intimately mingle with said heated refinery gas thus raising the temperature of the latter gas, causing the mixed gas while under said pressure, to contact a heated solid catalyst adapted to catalyze polymerization for a sufficient period of time to convert said unstable hydrocarbons by chemical change into vapors of more stable products and to cause pyrolyses of one of the hydrocarbon components of said refinery gas having a relatively high molecular weight, and subsequently cooling the resultant gas and removing therefrom the readily condensable products of reaction.

10. The process of treating combustible gas, being a petroleum refinery gas, comprising, heating said gas under super atmospheric pressure to a temperature of 400° to 800° F., completely burning another portion of said gas adjacent thereto, causing the freshly generated hot products of combustion under said pressure to intimately mingle with said heated refinery gas, thus raising the temperature of the latter gas, to about 800° to 1450° F., causing the mixed gas while thus heated under said pressure to contact a heated solid catalyst adapted to catalyze polymerization, for a predetermined period of time, in the presence of sulphur dioxide thereby converting said unstable hydrocarbons by chemical change into vapors of more stable products at least one of which is a polymerization product, and removing said product from said mixed gas by known steps.

11. The process of treating combustible gas, being a petroleum refinery gas, comprising, heating said gas under super atmospheric pressure to a temperature of 400° to 800° F. completely burning another portion of said gas adjacent thereto, causing the freshly generated hot products of combustion under said pressure to intimately mingle with said heated refinery gas, thus raising the temperature of the latter gas, to about 800° to 1450° F., causing the mixed gas while under said pressure to contact a heated solid catalyst adapted to catalyze polymerization, for a predetermined period of time in the presence of sulphur dioxide and water vapor thereby converting said unstable hydrocarbons by chemical change into more stable products, said period of time being of the order of 1 to 6 seconds, cooling the resultant gas and removing therefrom at least one of said products by known steps.

12. In the process of treating combustible gas for the removal therefrom of unstable olefinic hydrocarbons, by polymerization, the step comprises catalyzing said polymerization by the introduction of a relatively small percentage amount of freshly generated hot sulphur dioxide.

13. In the process of treating combustible gas for the removal of unstable olefinic hydrocarbons by polymerization, the steps comprising, heating said gas to a temperature suitable for the polymerization reactions to occur by burning a fuel containing both a hydrocarbon and a sulphur compound substantially in contact with said gas, causing the freshly generated hot products from the combustion of said fuel to mix with said gas and causing catalytic formation of the vapor of a polymer of said unstable hydrocarbon.

14. In the process of treating combustible gas for the removal of unstable olefinic hydrocarbons, in combination, the steps comprising, preheating said gas to a temperature of 300° to 800° F., while under pressure of about 50 to 175 pounds per square inch, subsequently heating it to a temperature of 650° to 1450° F. by burning substantially in contact therewith a fuel containing both a hydrocarbon and a sulphur compound, and causing the freshly generated products from the substantially complete combustion of said fuel to intimately mix with said heated gas.

15. In the process of treating combustible gas, comprising petroleum refinery gas, for the removal therefrom of unstable olefinic hydrocarbons chiefly by polymerization, the step comprising, causing said gas under superatmospheric pressure, at a temperature of about 650° to 1450° F., to contact a solid catalyst in the presence of freshly generated sulphur dioxide and water vapor; said catalyst having the property of catalyzing polymerization reactions.

16. The process of treating combustible gas containing unstable olefinic hydrocarbons, comprising, contacting said gas when heated and under superatmospheric pressure, in the presence of a relatively small amount of a gaseous catalyst, with a heated solid contact material for a period of time sufficient to cause the conversion of said unstable hydrocarbons to the vapor of stable compounds; said gaseous catalyst comprising freshly generated sulphur dioxide having the property of catalizing the polymerization of said unstable hydrocarbons, maintaining said solid contact material in a heated condition by the sensible heat of said heated gas, and subsequently cooling the resultant gas and removing therefrom the readily condensable products of reaction.

WILLIAM W. ODELL.